(12) United States Patent
Liao

(10) Patent No.: US 6,341,072 B1
(45) Date of Patent: Jan. 22, 2002

(54) ELECTRONIC EQUIPMENT ENCLOSURE

(75) Inventor: Nien-Chiang Liao, Lu-Chou (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/476,899

(22) Filed: Jan. 3, 2000

(30) Foreign Application Priority Data

May 15, 1999 (TW) .......................................... 88207777

(51) Int. Cl.[7] ................................................ H05K 7/14
(52) U.S. Cl. ...................... 361/825; 361/683; 361/725; 361/807; 312/223.2
(58) Field of Search ................................ 361/679, 683, 361/686, 727, 752, 740, 796, 797, 801, 802, 807, 825; 312/223.2

(56) References Cited

U.S. PATENT DOCUMENTS

| | | | |
|---|---|---|---|
| 4,977,532 A | * 12/1990 | Borkowicz et al. | ......... 364/708 |
| 5,172,305 A | * 12/1992 | DeWilde | .................... 361/683 |
| 5,590,023 A | * 12/1996 | Hernandez et al. | ......... 361/683 |
| 5,742,003 A | * 4/1998 | Ho | ............................ 174/35 R |
| 5,745,342 A | * 4/1998 | Jeffries et al. | .............. 361/683 |
| 5,777,848 A | * 7/1998 | McAnally et al. | .......... 361/725 |

FOREIGN PATENT DOCUMENTS

TW   86213339   * 1/1998

* cited by examiner

Primary Examiner—Jayprakash N. Gandhi
(74) Attorney, Agent, or Firm—Wei Te Chung (57) ABSTRACT

An electronic equipment enclosure for receiving a power supply includes main frame and a bracket attached to the main frame. The main frame has a back wall and a side wall attached to the back wall. The back wall defines a matching opening. The bracket has a first section and a second section perpendicularly extending from the first section. The first section of the bracket is attached to the match opening of the back wall.

16 Claims, 9 Drawing Sheets

ELECTRONIC EQUIPMENT ENCLOSURE

BACKGROUND OF THE INVENTION

1. Field of the Invention

The present invention relates to an enclosure of electronic equipment, and more particularly to an electronic equipment enclosure having a bracket for readily retaining a power supply.

2. The Related Art

An electronic equipment, such as personal computer, portable computer, workstation, server or HDD cabinet, usually has a power supply for changing alternating current (AC) to direct current (DC) for supplying electrical power to other components of the electronic equipment. A power supply of the personal computer such as a switching power supply is responsible for converting AC to DC needed for running the computer.

With the development of electronic equipment, the number of expansion component assembled in the electronic equipment becomes more and more, so space in the electronic equipment enclosure becomes more and more constrained, which makes it increasingly difficult to service internal components of the electronic equipment. Since a power supply is one of the largest components in an electronic equipment enclosure and it is connected to most of other components, means of mounting the power supply to the electronic equipment significantly affects the assembling/disassembling of the electronic equipment.

In U.S. Pat. Nos. 5,172,305 and 5,745,342, power supplies are pivotally mounted in computers by one or more hinges. The power supply may be pivotally moved out of its normal position allowing a user to service other components adjacent thereto. Although the hinge works well, the manufacture thereof usually raises the cost. Additionally, it is troublesome to attach the power supply to the hinge.

Also referring to Taiwan patent application No. 86213339, a mounting bracket is disclosed for retaining a power supply. The mounting bracket is attached to a rear wall of a computer enclosure by bolts, thereby causing tedious and laborious. Furthermore, since the mounting bracket is uneasily moved out of its normal position, it is cumbersome for a user to service other components adjacent to the power supply. It is requisite to provide a new structure of a bracket to solve the above problems.

SUMMARY OF THE INVENTION

Accordingly, an object of the present invention is to provide an electronic equipment enclosure having a bracket for retaining an electronic component, such as a power supply, with a simple way so that the electronic component may be moved from its normal position easily without the need of disassembling the whole enclosure.

Another object of the present invention is to provide an electronic equipment enclosure having a bracket pivotal out of its normal position for readily servicing other components located adjacent thereto.

A further object of the present invention is to provide an electronic equipment enclosure having a simple structure for being readily assembled.

In accordance with one aspect of the present invention, an electronic equipment enclosure includes a main frame and a bracket for receiving an electronic component. The bracket has a first section and a second section perpendicularly extending from the first section. A rim of the bracket has a plurality of hooks by which the bracket may be directly attached to a back wall of the main frame.

One novel feature of the present invention is that tabs of the hooks on the first section further define latches extending at right angle. The latch is hanged on and pivoted about the main frame, whereby the bracket receiving an electric/electrical component therein is pivotal to the main frame for access of other adjacent components.

Other objects, advantages and novel features of the invention will become more apparent from the following detailed description of preferred embodiments thereof when taken in conjunction with the accompanying drawings, wherein:

DETAILED DESCRIPTION OF THE PREFERRED EMBODIMENTS

It is noted here that for facilitating understanding like components are designated by like reference numerals throughout the various embodiments of the present invention as shown in the attached drawing figures.

Figure 1:
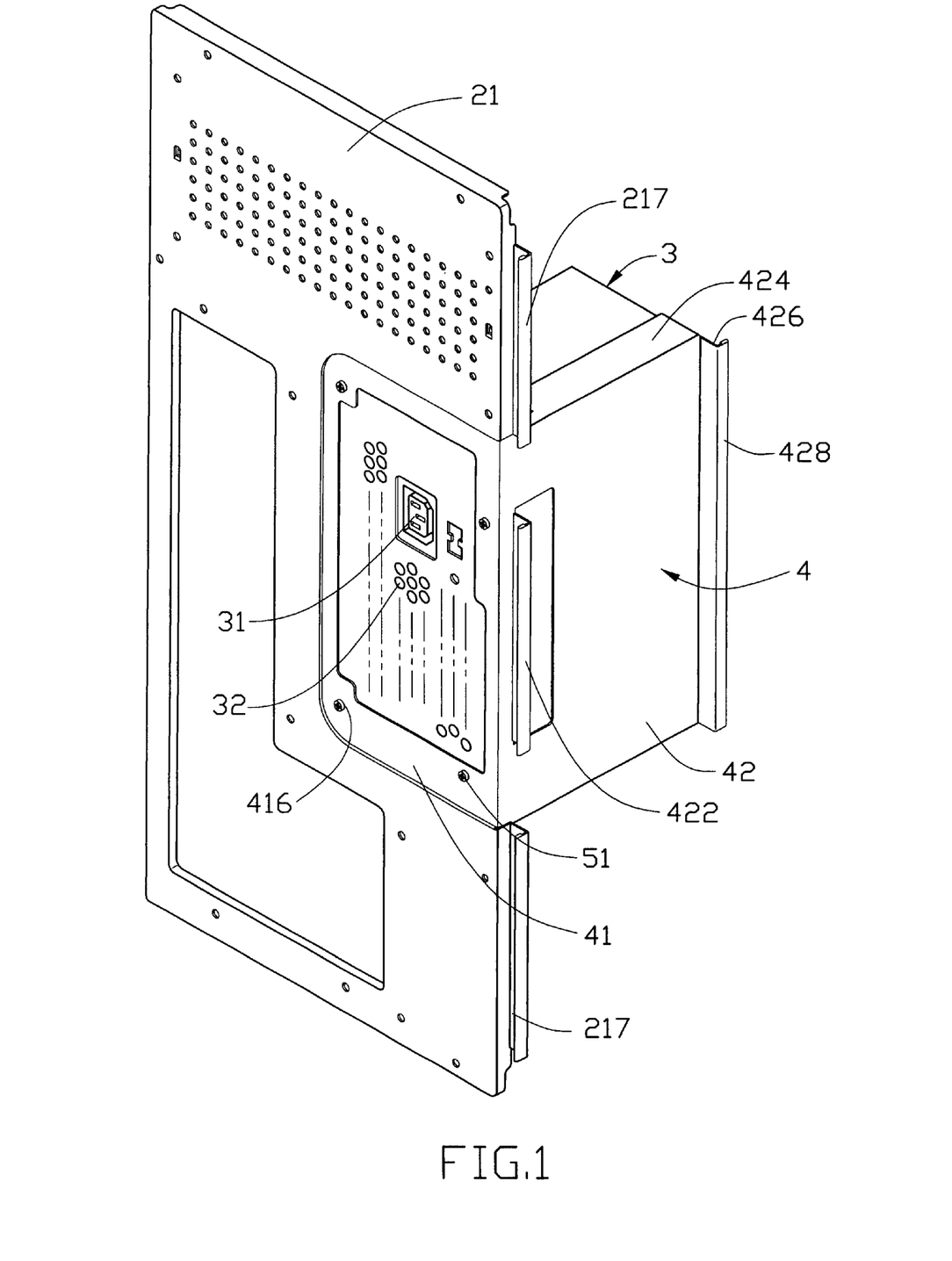
FIG. 1 is a perspective view of a part of an electronic equipment enclosure in accordance with a first embodiment of the present invention with a power supply attached thereto.
Figure 2:
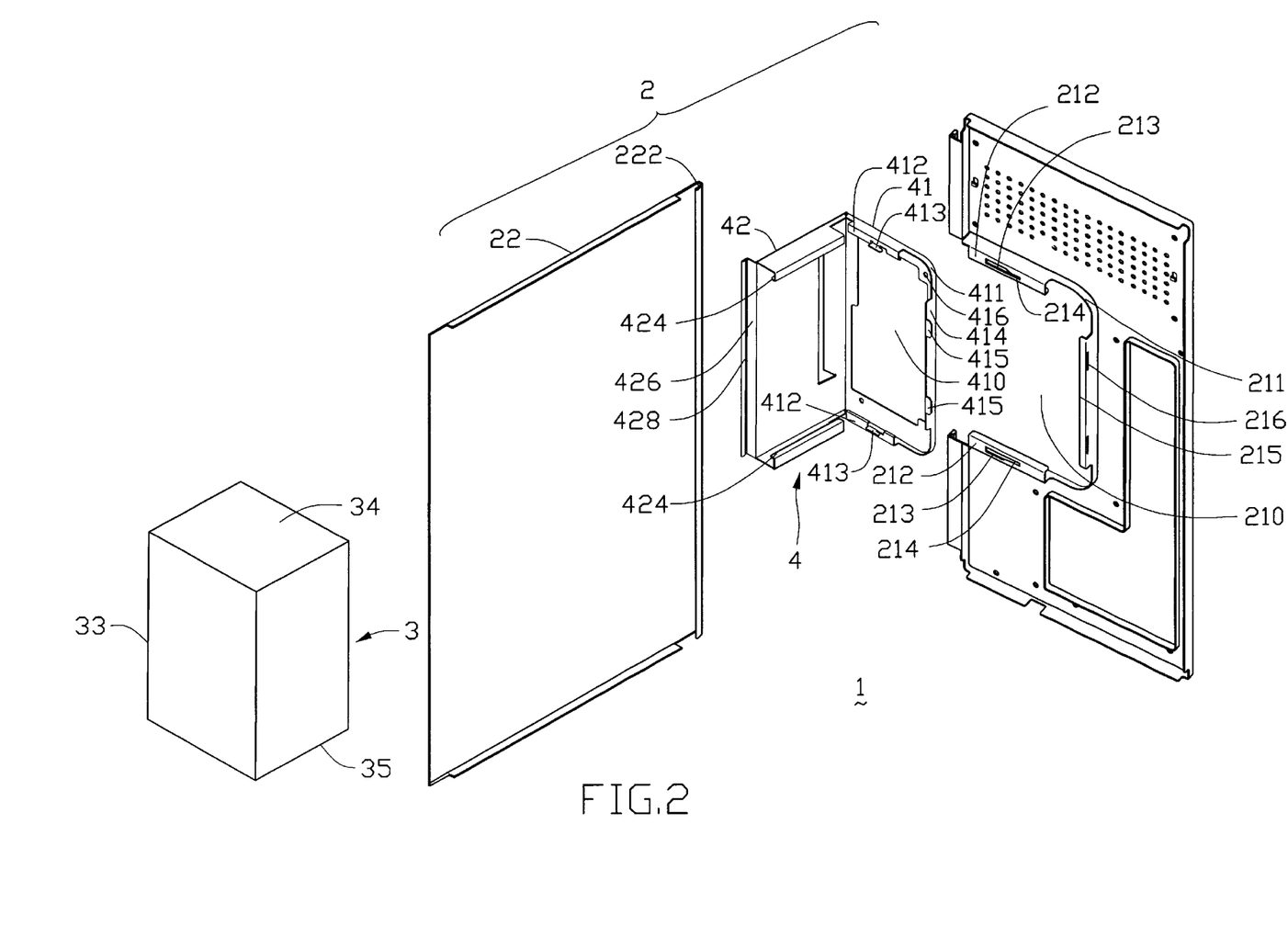
FIG. 2 is an exploded view of the electronic equipment enclosure of FIG. 1 adding a side wall.
Figure 3:
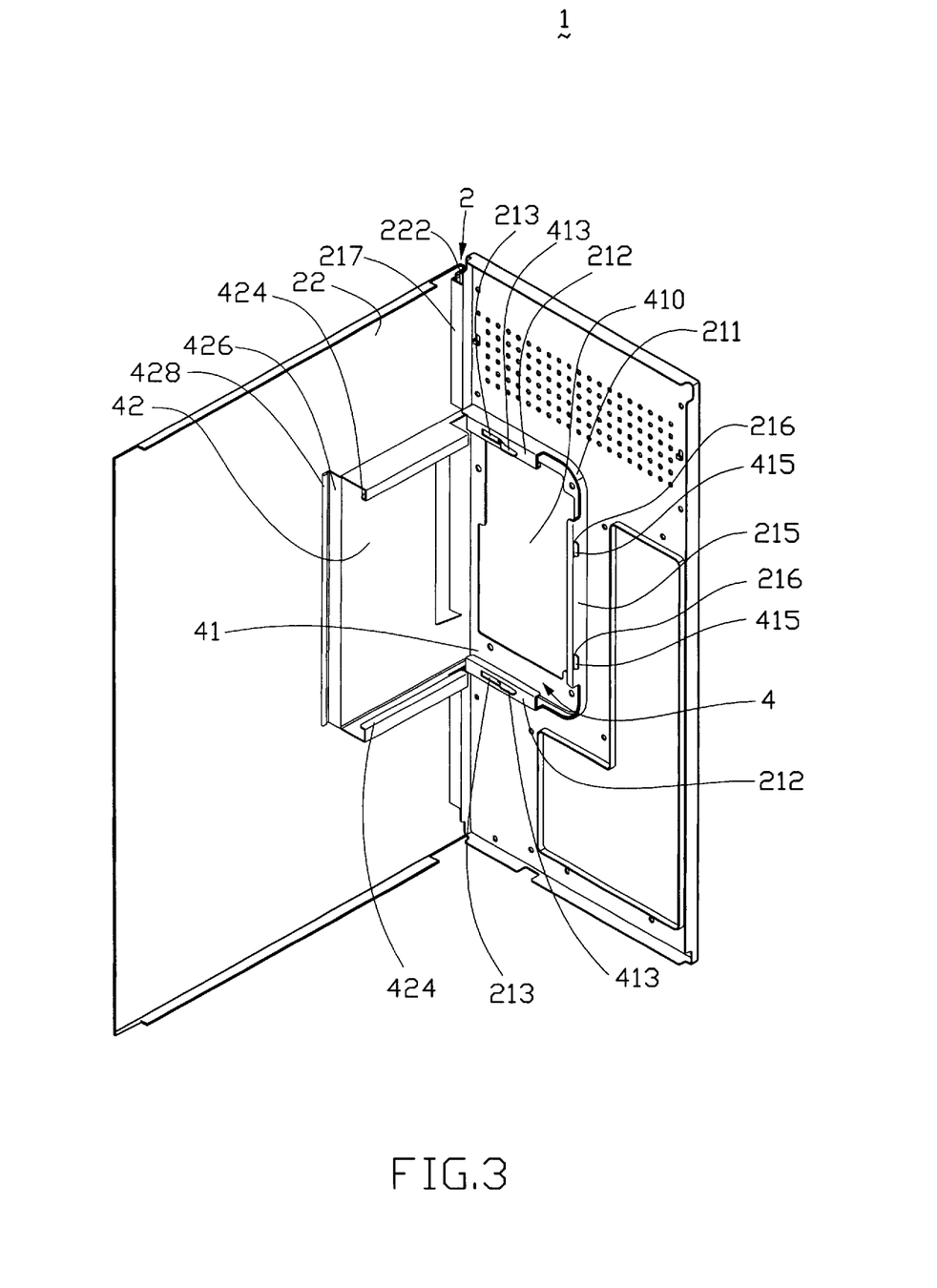
FIG. 3 is an assembled view of FIG. 2, the power supply being omitted for clearly showing the bracket attached to the enclosure.

Referring to FIGS. 1–3, a part of an electronic equipment enclosure 1 in accordance with a first embodiment of the present invention comprises a main frame 2 and a bracket 4 for receiving a power supply 3 therein. The main frame 2 has a back wall 21 and a side wall 22 which are only a part of a full enclosure. The back wall 21 defines a match opening 210 for receiving the bracket 4. The bracket 4 defines an opening 410 for providing access to a cable (not shown) connected to the power supply 3. The bracket 4 and the power supply 3 are firstly assembled together and then received in the match opening 210 of the back wall 21. The opening 410 of the bracket 4 is in communication with the match opening 210 of the back wall 21 for providing access to the cable connected to the power supply 3.

The bracket 4 is L-shaped and includes a first sections 41 and a second section 42 perpendicularly extending from the first section 41. The opening 410 is defined in the first section 41. A plurality of holes 416 is defined around the opening 410 of the first section 41 for receiving screws 51 therethrough to fix the power supply 3 to the bracket 4. Thus, a receptacle 31 and air vents 32 of the power supply 3 face outside through the opening 410 to respectively connect an outer power plug and dissipate heat. A flange 411 is formed along edges of the first section 41, preferably by bending the corresponding portions of the first section 41 at a right angle. A pair of rails 412 contiguously extends from opposite end portions of the flange 411. A first prop 414 extends between the pair of rails 412. As better shown in FIG. 2, a pair of locking hooks 413 is provided on the rails 412 and is preferably formed by stamping. A pair of tabs 415 extends perpendicularly from the prop 414. The second section 42 is provided for propping a side 33 of the power supply 3. A pair of supporting eaves 424 extends from upper and lower edges of the second section 42 for retaining bottom and top surfaces 34, 35 of the power supply 3. A flange 426 extends from a front side of the second section 42 and further inwardly forms a baffle 428 opposite the second section 42 with a step for abutting against an inner surface of the side wall 22. The second section 42 has a clasp 422 on a backside of the second section 42, which cooperates with a like clasp 217 on the back wall 21 to fix the side wall 22.

A flange 211 like that at the first section 41 extends from edges of the match opening 210 of the back wall 21 for engaging with the flange 411. Upper and lower edges of the flange 211 respectively define a frame shaped guiding member 212 whose inner size is a little bigger than the rail 412 for slidably receiving the rail 412 therein. Each of the guiding members 212 defines a slot 213 for slidably engaging with the hook 413, and the end of the slot 213 defines a narrower portion 214 along the sliding direction. A second prop 215 extends from a side edge of the flange 211 for engaging with the first prop 414. A pair of holes 216 is defined in the second prop 215 for receiving the tabs 415. The back wall 21 forms two grasps 217 adjacent the match opening 210.

As best shown in FIG. 3, the bracket 4 or the assembly of the bracket 4 and the power supply 3 is mounted to the main frame 2. The flanges 211, 411 are slidably engaged with each other, the hooks 413 are locked in the narrower portions 214 of the slots 213, the tabs 415 are traversed through the holes 216, and the baffle 428 abuts against the inner surface of the side wall 22. Thus, the bracket 4 is readily secured in the match opening 210.

Figure 4A:
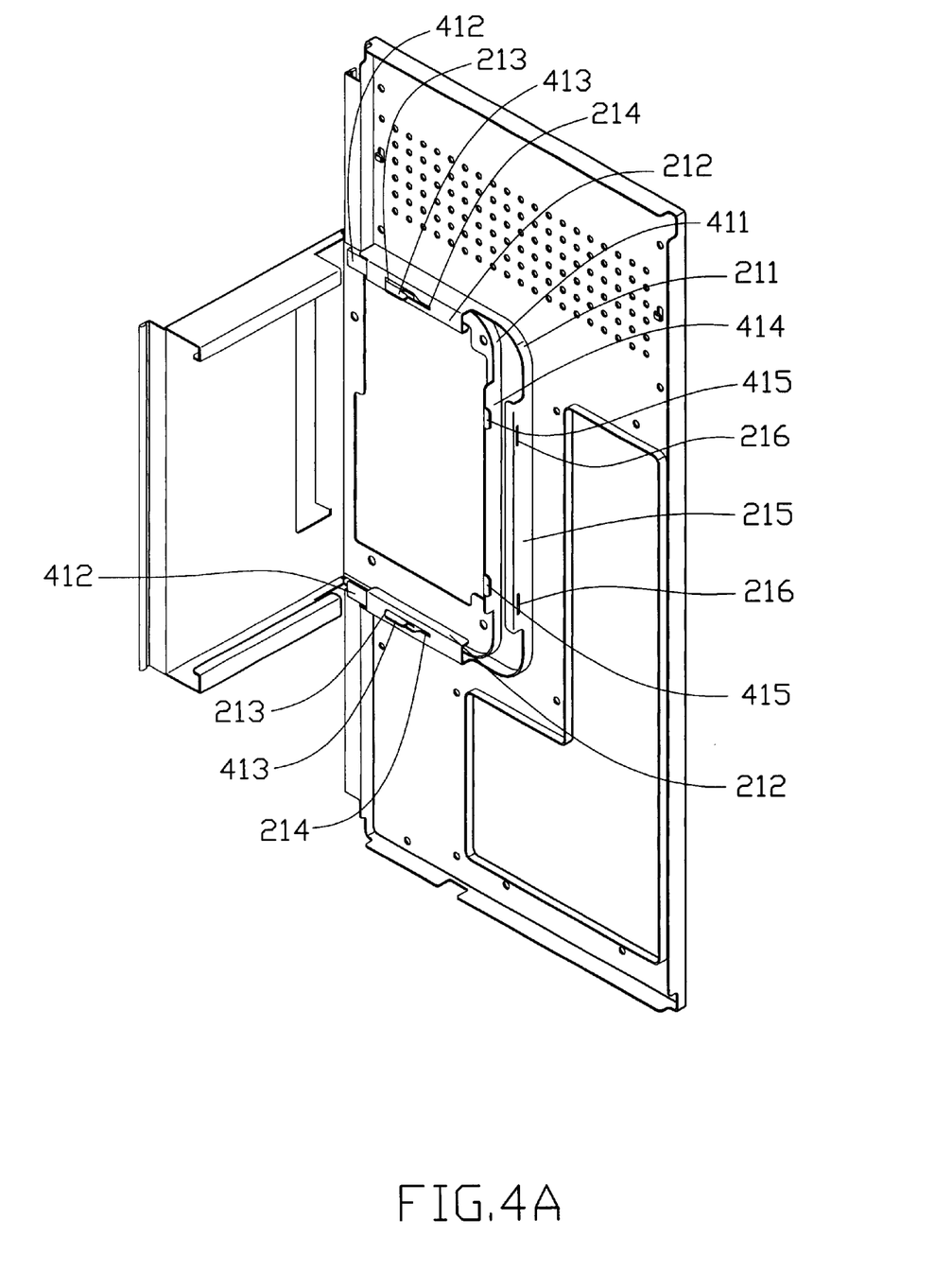
FIG. 4A is a similar view of FIG. 3, with the side wall being removed for showing an intermediate stage when the bracket is assembled to the main frame.
Figure 4B:
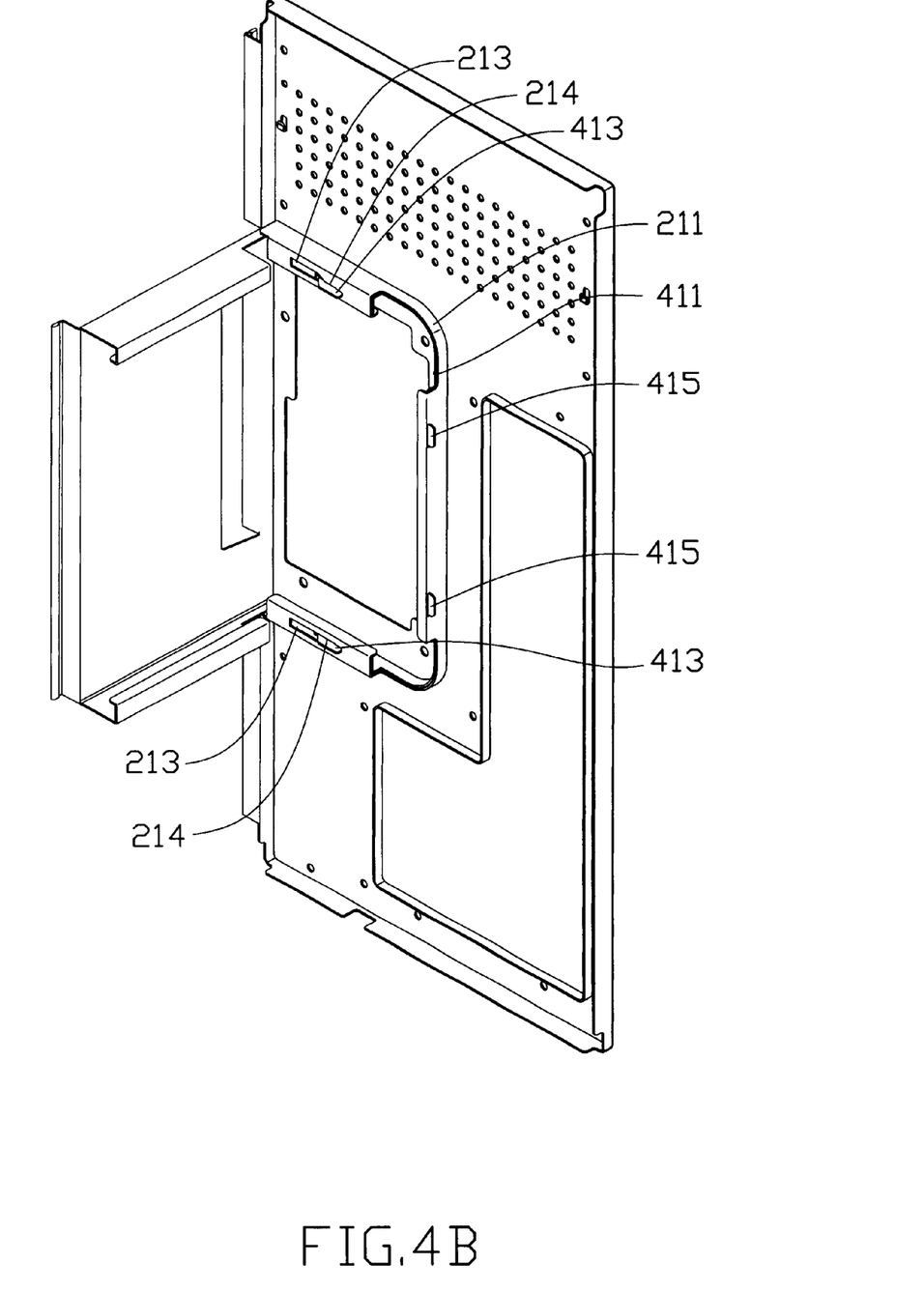
FIG. 4B is similar to FIG. 4A showing the bracket fully attached to the main frame.

FIGS. 4A and 4B illustrate continuous states for mounting the bracket 4 to the electronic equipment enclosure 1. Originally, the rails 412 of the bracket 4 are aligned with the guiding members 212 of the back wall 21 and then are pushed to slide in the guiding members 212, and the tabs 415 are traversed through the holes 216, wherein the hooks 413 are inserted into the slots 213 and finally locked in the narrower portions 214 as shown in FIG. 4B. Thus, the flange 411 and the flange 211 are coupled together thereby fixing the bracket 4 to the electronic equipment enclosure 1 as shown in FIG. 4B. On the contrary, the bracket 4 with power supply 3 may be easily displaced from their normal position via a reverse procedure from FIG. 4B to FIG. 4A. It can be seen from the above described that the assembling of the power supply 3 to the electronic equipment enclosure 1 is quite simple and the power supply 3 together with the bracket 4 may be drawn out from their normal position for facilitating accessing of other components nearby.

Figure 5:
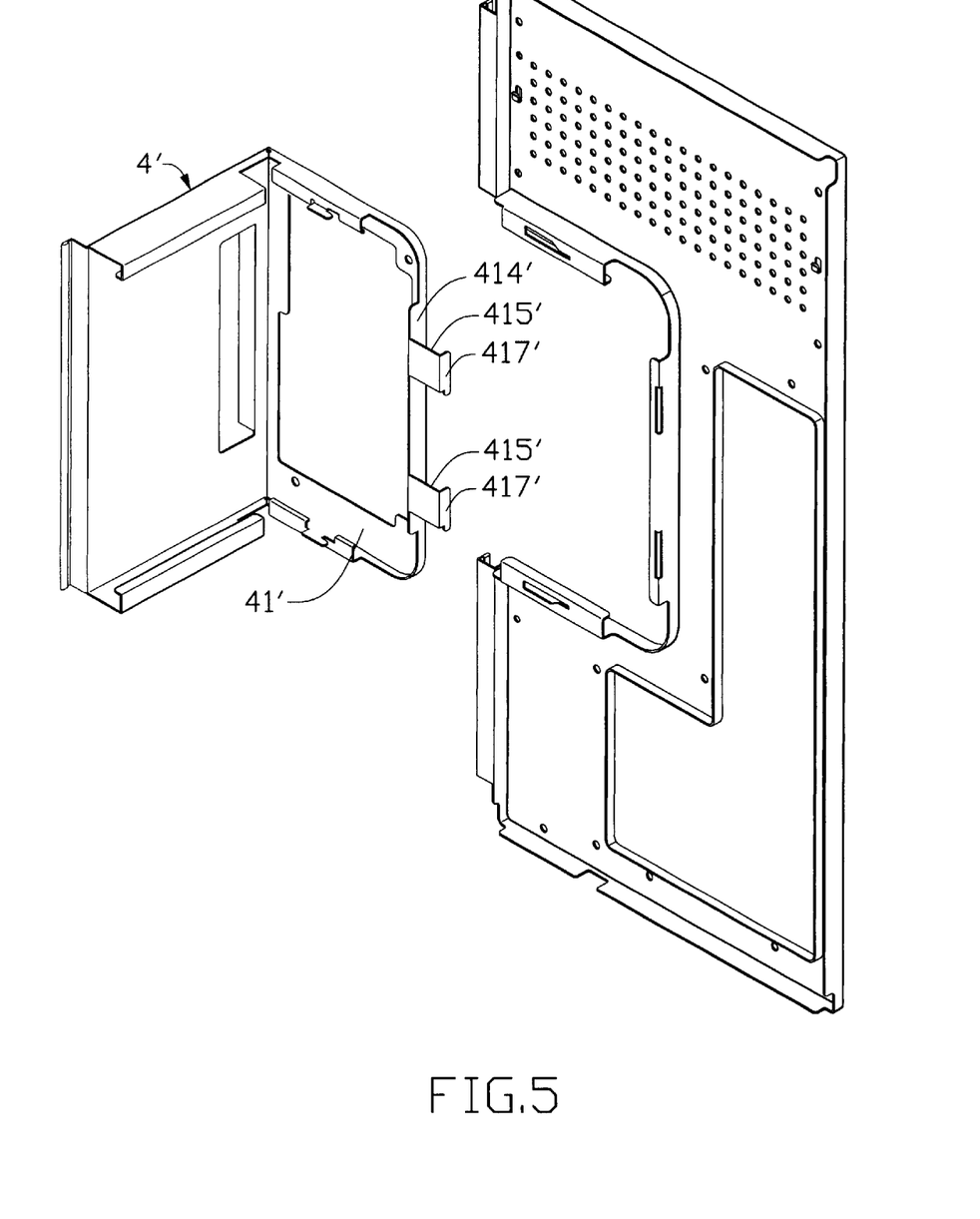
FIG. 5 is an exploded view of a part of an electronic equipment enclosure in accordance with a second embodiment of the present invention.

FIG. 5 illustrates an electronic equipment enclosure 1' in accordance with a second embodiment of the present invention. Most of the structures of the second embodiment are the same as those of the first embodiment, so the similar description is omitted herein. The difference is in that each tab 415' of the bracket 4' additionally forms a latch 417' bent at right angle from the tab 415' and pivotally retained in the hole 216. With this new tab 415', the bracket 4' is retainable and pivotally mountable on the back wall 21.

Figure 6A:
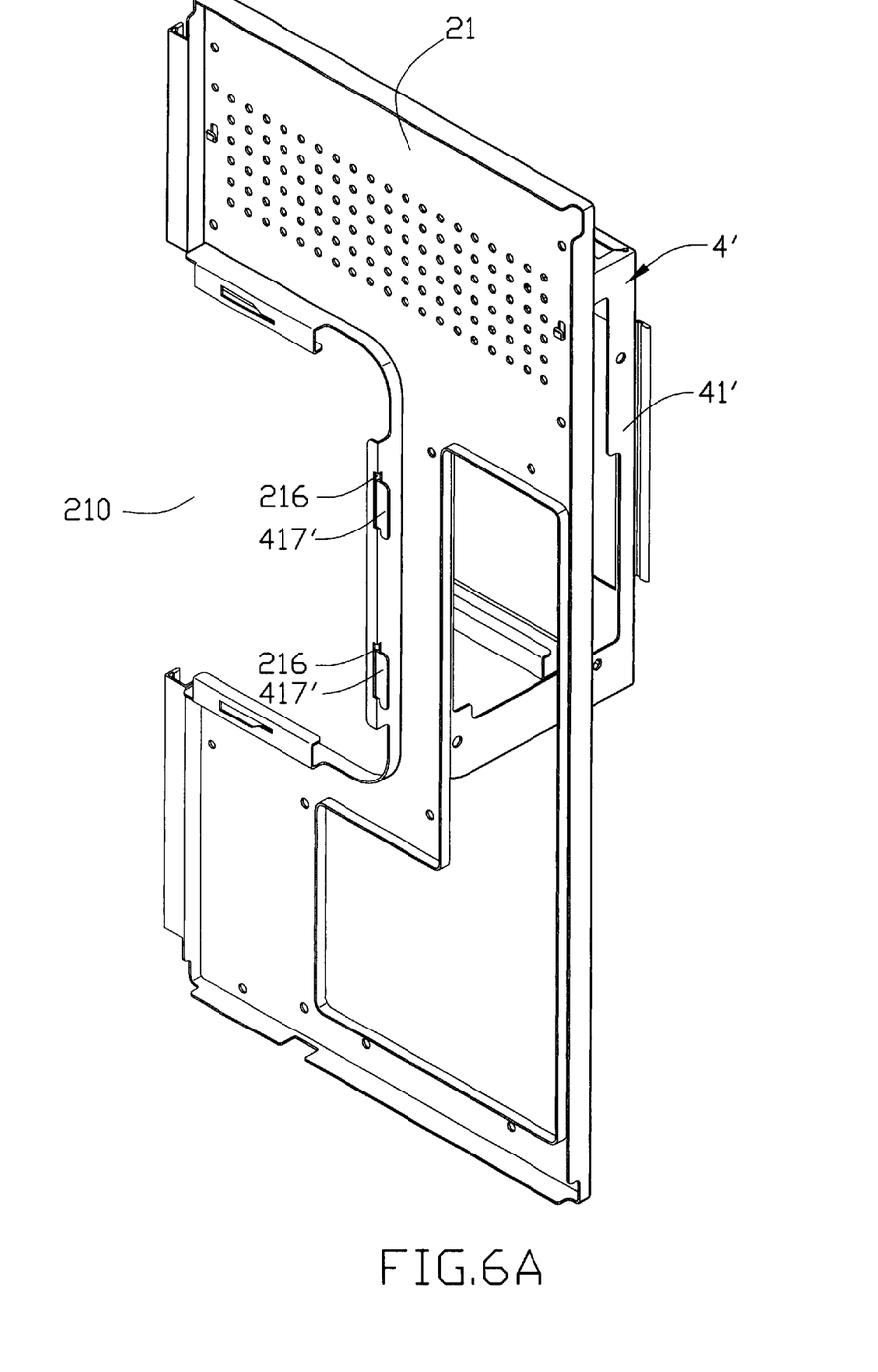
FIG. 6A is an assembled view of FIG. 5 showing an initial stage of mounting a bracket to a main frame.
Figure 6B:
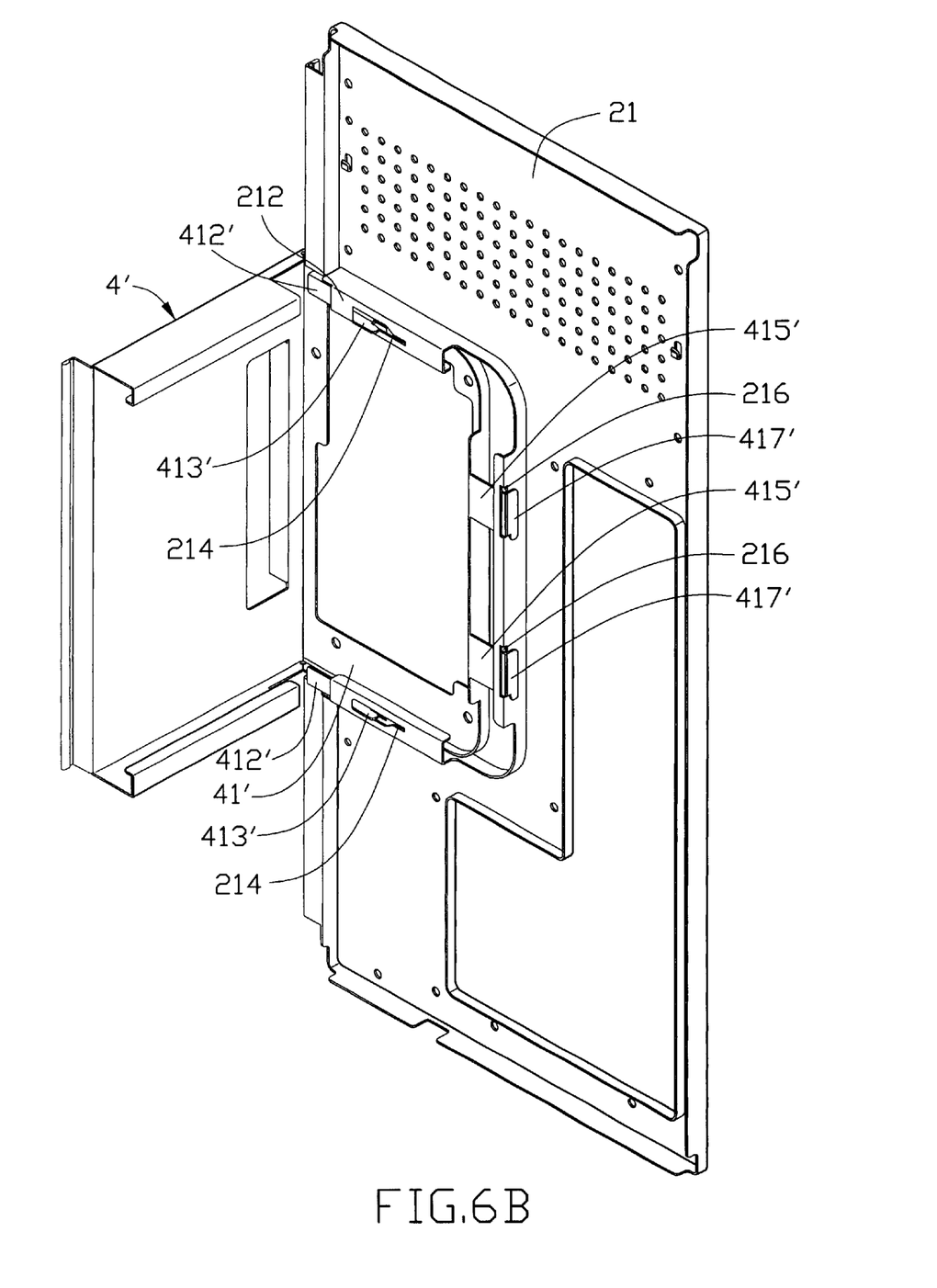
FIG. 6B is similar to FIG. 6A showing an intermediate stage of mounting the bracket to the main frame.
Figure 6C:
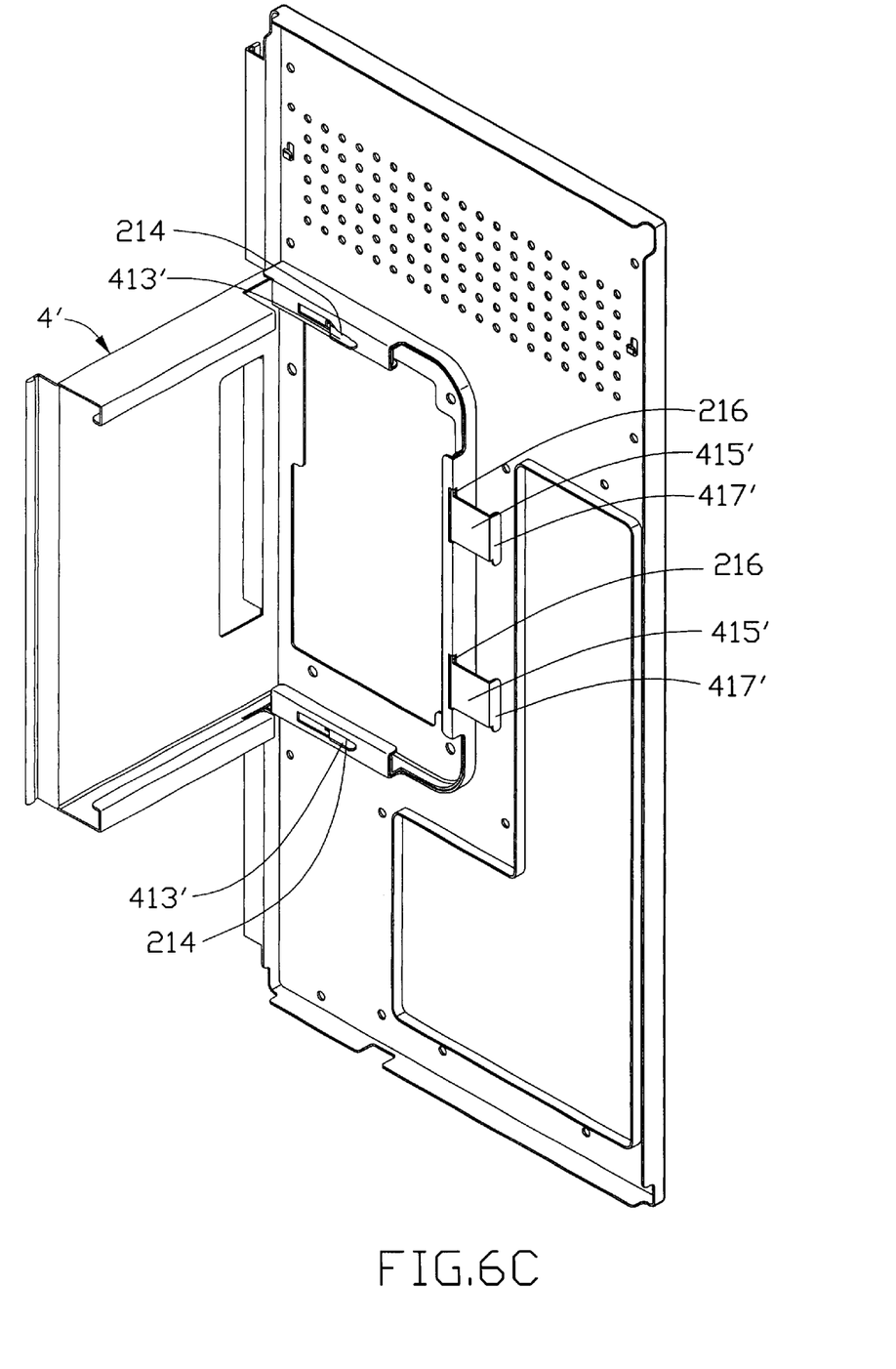
FIG. 6C is similar to FIG. 6A showing that the bracket has been fully attached to the main frame.

FIGS. 6A–6C illustrate the mounting procedure of the bracket 4' to the electronic equipment 1' according to the second embodiment. Firstly referring to FIG. 6A, the first section 41' of the bracket 4' is manually aligned perpendicular to the back wall 21 for inserting the latches 417' into the holes 216 to retain the bracket 4' on the back wall 21. Secondly, referring to FIG. 6B, the bracket 4' is manually pivotally moved to an intermediate position, wherein the first section 41' is located in the match opening 210, the rails 412' of the bracket 4' are received in the guiding members 212 of the back wall 21, the hooks 413 are inserted into the slots 213, the latch 417' is adjacent to the hole 216, and the first prop 414 is distanced away from the second prop 215. Finally, referring to FIG. 6C, the rails 412' of the bracket 4' is manually moved to slide in the guiding members 212 until the hooks 413' are locked in the narrower portion 214 of the slot 213, and the first prop 414 engages with the second prop 215. Thus, the bracket 4' is readily fixed to the back wall 21. Contrarily, the bracket 4' with power supply 3 can be easily moved from their normal position with respect to the ball wall 21. It can be seen from the above described that the assembling of the power supply 3 to the electronic equipment enclosure 1' is quite simple and the power supply 3 can be pivoted out of position together with the bracket 4 and hanged on the main frame for facilitating the user to access other components.

The above embodiments are only illustrations of how the power supply 3 is mounted to the electronic equipment 1 or 1', but other electric components, such as a fan group, also can apply the present invention.

While the present invention has been described with reference to specific embodiments thereof, the description is illustrative and is not to be construed as limiting the invention. Various modifications to the present invention may be made to the preferred embodiments by those skilled in the art without departing from the spirit and scope of the invention as defined by the appended claims.

We claim:

1. An electronic equipment enclosure adapted to receive an electric component, comprising:
    a main frame having a back wall and a side wall, the back wall having a portion cut away to form a match opening; and
    a bracket being slidably attached to the match opening of the back wall and retaining the electric component therein, wherein the bracket has at least one hook extending therefrom, and a rim of the match opening of the back wall has at least one slot for slidably receiving the at least one hook and further defines a narrower portion to latch the at least one hook;
    the side wall being detachably engaged with the back wall and abutting against the bracket to prevent the bracket from sliding out of the match opening;
    wherein when the side wall is detached from the back wall, the bracket may slide out of the match opening.

2. The electronic equipment enclosure as claimed in claim 1, wherein the bracket has a first section filled in the matching opening and a second section perpendicularly extending from the first section and abutting against the side wall.

3. The electronic equipment enclosure as claimed in claim 2, wherein the first section defines an opening from which the electric component communicates with exterior.

4. The electronic equipment enclosure as claimed in claim 2, wherein upper, lower, and side rims of the first section and the match opening are respectively bent to form a pair of inter-engaged flanges.

5. The electronic equipment enclosure as claimed in claim 4, wherein the inter-engaged flanges respectively formed in the side rims respectively define at least a tab and at least a hole which are engaged with each other.

6. The electronic equipment enclosure as claimed in claim 4, wherein the flanges respectively formed in the upper and lower rims of the first section and the back wall are further folded into inter-engaged rails and guiding members.

7. The electronic equipment enclosure as claimed in claim 6, wherein a hook is formed on the rail and a slot is formed in the guiding member for engaging with each other.

8. The electronic equipment enclosure as claimed in claim 2, wherein a pair of supporting eaves are formed by bending the upper and the lower edges of the second section for retaining the electric component.

9. The electronic equipment enclosure as claimed in claim 2, wherein the second section further forms an outwardly extended baffle abutting against the side wall.

10. The electronic equipment enclosure as claimed in claim 2, wherein the second section and the back wall respectively define a clasp aligned with each other and engaging with the side wall.

11. The electronic equipment enclosure as claimed in claim 1, wherein the electric component may be a power supply or a fan group.

12. An electronic equipment enclosure adapted to receive an electric component, comprising:

a main frame having a back wall and a side wall, the back wall having a portion cut-away to form a match opening; and a bracket for receiving an electronic component, the bracket having means for pivotally mounting to the back wall for movement between a first position in which the bracket is mounted and received in the match opening, and a second position in which the bracket is disposed out of the match opening, the bracket being pressed by the side wall as the side wall is mounted to the back wall, wherein the bracket has a first section engaging with the matching opening and a second section perpendicularly extending from the first section and abutting against the side wall.

13. The electronic equipment enclosure as claimed in claim 12, wherein the means for pivotally mounting the bracket to the back wall comprises at least one tab.

14. The electronic equipment enclosure as claimed in claim 13, wherein the at least one tab extends from a side edge of the first section and has a latch formed perpendicular to one end thereof for engaging with a corresponding hole defined in an edge of the match opening.

15. The electronic equipment enclosure as claimed in claim 12, wherein upper, lower, and side rims of the first section and the match opening are bent into a pair of inter-engaged flanges.

16. The electronic equipment enclosure as claimed in claim 15, wherein the flange formed in the side rim of the bracket defines at least a tab and a latch formed by bending the tab at right angle from one end thereof for engaging with corresponding hole formed in the flange of the match opening.

* * * * *